United States Patent [19]
Schibler et al.

[11] 3,927,089
[45] Dec. 16, 1975

[54] PROCESS FOR THE MANUFACTURE OF LOW MOLECULAR REACTIVE SURFACE-ACTIVE AGENTS FROM CARBAMIDES

[75] Inventors: Luzius Schibler, Riehen; Jurg Merz, Therwil, both of Switzerland

[73] Assignee: Ciba-Geigy AG, Basel, Switzerland

[22] Filed: Mar. 26, 1973

[21] Appl. No.: 344,820

[30] Foreign Application Priority Data
Mar. 28, 1972 Switzerland.......................... 4633/72

[52] U.S. Cl............................. 260/553 R; 252/541
[51] Int. Cl.$^2$...................................... C07C 127/16
[58] Field of Search................................ 260/553 R

[56] References Cited
UNITED STATES PATENTS
3,145,207   8/1964   Wohnsiedler............... 260/553 R X FOREIGN PATENTS OR APPLICATIONS
465,800   6/1950   Canada........................... 260/553 R OTHER PUBLICATIONS
Ugelstad et al., Acta Chemica Scandinavica, Vol. 10 pp. 1475–1487 (1956).

Primary Examiner—Gerald A. Schwartz
Attorney, Agent, or Firm—Joseph G. Kolodny; Prabodh I. Almaula; Edward McC. Roberts

[57] ABSTRACT

A new process for the manufacture of low molecular reactive surface-active agents from carbamides, which comprises reacting a monomethylol compound of a carbamide, which is optionally etherified with a monohydric alcohol with 4 to 7 carbon atoms, with a hydrophobic or hydrophilic hydroxy compound thereafter introducing a second methylol group into the ether compound thus obtained by means of formaldehyde or a formaldehyde donor, and etherifying this methylol group with a hydrophilic or hydrophobic hydroxy compound in such a way that the end product contains at least one hydrophobic and one hydrophilic group.

8 Claims, No Drawings

PROCESS FOR THE MANUFACTURE OF LOW MOLECULAR REACTIVE SURFACE-ACTIVE AGENTS FROM CARBAMIDES

The subject of the invention is a process for the manufacture of low molecular, preferably monomeric, reactive surface-active agents from carbamides, characterised in that a monomethylol compound of a carbamide, which is optionally etherified with a monohydric alcohol with 4 to 7 carbon atoms, is reacted with a hydrophobic or hydrophilic hydroxy compound, thereafter a second methylol group is introduced into the ether compound by means of formaldehyde or a formaldehyde donor, and this methylol group is etherified with a hydrophobic or hydrophilic hydroxy compound in such a way that the end product contains at least one hydrophobic and one hydrophilc group.

The process according to the invention consists fundamentally of manufacturing asymmetrical ethers of a dimethylolcarbamide, wherein one ether group has hydrophilic character and the other hydrophobic character. The starting product is preferably monomethylolurea, which is optionally etherified with an alkanol with 4 to 7 carbon atoms, and which is first hydrophobically or hydrophilically etherified or trans-etherified. A second molecule of formaldehyde is added onto the resulting monoether of methylolurea and the monoether of dimethylolurea is thereby obtained. This monoether is further etherified with a hydrophilic or hydrophobic hydroxy compound in such a way that an end product results which possesses both a hydrophilic and a hydrophobic ether group. Such compounds possess the characteristics of a surface-active agent, that is to say they dissolve in liquid solvents, they accumulate at their surfaces and they reduce the surface tension of the solvent.

It is known that so-called reactive surface-active agents, that is to say water-soluble curable mixed ethers of polymethylol compounds of melamine or ureas can be manufactured by etherifying these compounds with alcohols containing 4 to 6 carbon atoms and further modifying the resulting macromolecular etherification products, the so-called aminoplast lacquer resins, with polyethylene glycols. A part of the ether groups which contain 4 to 6 carbon atoms and are responsible for the hydrophobic character of the macromolecule is thereby replaced by hydrophilic polyglycol-ether groups. Water-soluble compounds which however also carry hydrophobic groups, and which are to be regarded as macromolecular surfaceactive agents, are obtained. The fact that they can be cured, that is to say crosslinked in an acid medium, justifies the description "reactive surface-active agents".

it has now been found that whilst such etherification products manufactured from polymethylol compounds in the manner mentioned and substituted by hydrophobic and hydrophilic groups are excellent emulsifiers and dispersing agents, they are however on the other hand less suitable for use as washing agents and wetting agents, that is to say do not show a satisfactory action, because of the size of the molecules.

Carbamide-polymethylol compounds can easily be etherified in the presence of acid with hydroxy compounds of all kinds, for example butanol and/or polyalkylene glycols. Since, however, at the same time crosslinking of the molecules also aways takes place, almost exclusively macromolecular compounds are thereby obtained.

It has now been found, surprisingly, that the formation of macromolecular compounds can largely be avoided and asymmetrical ethers which are extremely effective as surfaceactive agents can be manufactured, by starting from the monomethylol compound of a carbamide. Represented schematically, the manufacture of the reactive surface-active agents, starting from carbamide, as a rule takes place as follows:

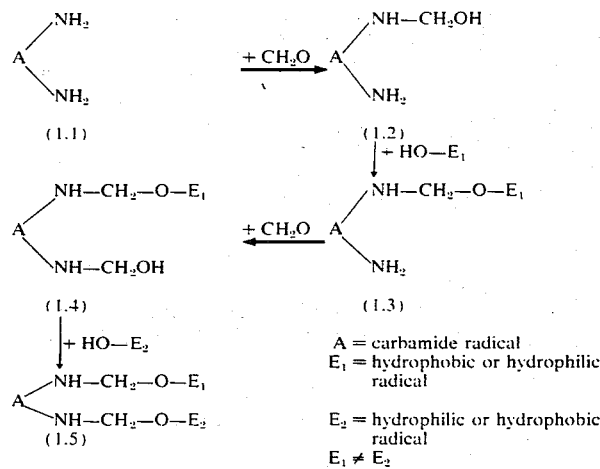

The surface-active agents manufactured in this way differ from the customary surface-active agents in that they are reactive. This is because being derivatives of, for example, dimethylolurea, they can, like the latter, be cross-linked in an acid medium. The ether groups are split off and the aminoplast precondensate which is left can be cured to give the insoluble resin.

Though urea and monomethylolurea are the outstanding starting products it is possible in principle, to use all carbamides into the etherified monomethylol compounds of which further methylol groups can be introduced.

Such carbamides are also grouped together under the term aminoplast precursors. As aminoplast precursors which are suitable for the manufacture of the monomethylol compounds used according to the invention there may be mentioned: urea, thiourea, substituted ureas, such as alkylureas and arylureas, alkyleneureas and alkylenediureas such as ethyleneurea, propyleneurea, dihydroxyethyleneurea, hydroxypropyleneurea and acetylenediurea and also dicyandiamide, dicyandiamidine, urones and hexahydropyrimidones.

A particularly suitable embodiment of the process according to the invention consists of reacting a compound of the formula (2) $H_2N - CO - NH - CH_2 - O - R$, wherein R denotes alkyl or alkenyl each with 6 to 22 carbon atoms, alkylcyclohexyl or alkylphenyl each with 2 to 12, preferably 6 to 10, carbon atoms in the alkyl part or cycloalkyl with 8 to 14 ring carbon atoms, with formaldehyde or a formaldehyde donor and subsequently etherifying the product with a polyalkylene glycol of average molecular weight at most 2,000.

Amongst the meaning of R, alkyl or alkenyl with 6 to 22, especially with 10 to 18, carbon atoms is preferred.

However, within the scope of the formula (2), the compounds of the formula (3) $H_2N - CO - NH - CH_2 - O - R_1$ wherein $R_1$ represents alkyl with 10 to 18 carbon atoms, should be singled out particularly.

The hydrophobic group or the radical R in the reactive surface-active agent is preferably derived from alkanols or alkenols with 6 to 22 carbon atoms, for example n-octanol, n-decanol, lauryl alcohol, cetyl alcohol, stearyl alcohol, oleyl alcohol, behenyl alcohol and ricinol, and also, for example, from cycloalkanols, such as cyclododecanol, alkylcycloalkanols, such as p-nonylcyclohexanol or hydroabietyl alcohol, or from alkylphenols, such as nonylphenol. The hydrophilic radical in the reactive surface-active agents is appropriately derived from a polyalkylene glycol with an average molecular weight of 106 – 2,000. Possible polyalkylene glycols are, for example, polybutylene glycol or especially polypropylene glycol or polyethylene glycol. Polyethylene glycols with an average molecular weight of 106 to 1,500 are particularly suitable for the introduction of the hydrophilic group. The preferred polyethylene glycols as a rule contain 2 to 35 ethoxy units.

The second methylolation of the N-monoethermethylol compound is preferably carried out with formaldehyde or with formaldehyde donors, appropriately at temperatures of 40 to 100°C. Suitable formaldehyde donors are above all trioxane, paraformaldehyde and hexamethylenetetramine.

The reaction of the dimethylol-monoether, for example of compounds of the formula (2) with the polyalkylene glycol is appropriately carried out in the presence of a weak acid, at a temperature of 80° to 120°C and a pressure of 1 to 30 mm Hg. 80° to 100°C, and 10 to 25 mm Hg pressure, are particularly advantageous conditions. Suitable weak acids are above all alkanecarboxylic acids with 1 to 3 carbon atoms, such as formic acid, acetic acid or propionic acid.

The monomethylol compound of the carbamide, for example of urea itself, is easily obtainable from the carbamide or from urea by addition of one molecule of formaldehyde under weakly alkaline conditions and at a low temperature. Monomethylolurea can, for example, easily be isolated as a solid, relatively stable substance from aqueous solution by evaporation in vacuo, spray drying or freeze-drying. The monomethylolurea, which still contains about 5% of water, is then etherified with an excess of a monohydric alcohol, preferably of an alkanol, with 4–7 carbon atoms. n-Butanol is outstanding as such as alcohol, but it is also possible to use, for example, amyl alcohol, hexanol, heptanol, cyclohexanol or benzyl alcohol. The excess of these relatively easily volatile alcohols which remains after the etherification can easily be removed by heating in vacuo. This is particularly important because in the case of low molecular or monomeric surface-active agents alcohol radicals containing 4 to 7 carbon atoms are insufficiently hydrophobic or lipophilic as the ether group and therefore longer chains must be introduced by trans-etherification with higher alcohols such as lauryl alcohols, stearyl alcohol, oleyl alcohol, higher cycloalkanols or alkyl-substituted phenols. A particularly appropriate procedure is first to manufacture the n-butyl-ether of the monomethylolurea and subsequently to trans-etherify it with a higher and less volatile alkanol, alkenol, cycloalkanol or alkylphenol. Since the etherification and transetherification as a rule take place in a weakly acid medium, a slight formation of resin is unavoidable. However, the resin formed can easily be removed by filtration from the solution of the monomethylolurea-ether in dilute alcohol. A second molecule of formaldehyde is now added onto the etherified monomethylolurea in a further step of the process, this molecule of formaldehyde being allowed to act on the monoether from an excess of a dilute alcoholic, slightly alkaline solution. It is surprising that the dimethylolurea-monoether formed can be smoothly converted to a reactive surface-active agent by reaction of the free methylol group with polyalkylene glycol.

The reaction is appropriately carried out by heating the components in vacuo in the presence of a weak acid, for example acetic acid, which in part distils off together with the water formed during the etherification. After completion of the reaction, the mixture is preferably neutralised with a base such as triethanolamine. Though a slight crosslinking also occurs during this reaction predominantly monomeric or low molecular reactive surface-active agent is nevertheless obtained, which clearly differs from the known higher-molecular reactive surface-active agents in possessing a substantially better washing and wetting action.

Though the above procedure is preferred there is also the possibility of introducing the hydrophilic group first. The monomethylolcarbamide compound is etherified with a polyalkylene glycol in a first stage, and at least a second methylol group is introduced into the resulting monoether by the action of formaldehyde. This methylol group is etherified in a further stage, for example with a monohydroxy compound containing more than 7 carbon atoms, and here again the butyl ether is approximately chosen as the intermediate compound, that is to say the butyl ether is first manufactured and replaced by a more strongly hydrophobic group, for example a dodecyl, stearyl or nonylphenyl group, by transetherification.

The properties of the surface-active agents formed can be varied within wide limits by the choice of the hydrophobic group and by the length of the polyalkylene glycol-ether chain, and in general a longer polyalkylene glycol-ether chain should be allocated to a strongly hydrophobic group, and vice versa.

By the term "low molecular reactive surface-active agents" there are to be understood, in the present case, predominantly monomeric products which do not contain any polymeric constituents but at most oligomeric constituents, that is to say at most condensation products of, as a rule, 2 to 6 monomer units, and which, at a suitable concentration in aqueous solution, for example 2 to 10 g/l, tend to distinctly visible micelle formation.

The products manufactured according to the process of the invention are reactive, due to their methylol or etherified methylol groups, and can, depending on the substitution, be employed for various purposes as so-called reactive surface-active agents, that is to say as reactive surface-active products which can, under certain conditions, for example in an acid medium or at higher temperatures, be converted into an irreversibly insoluble state. They can thus, for example, be used in the manufacture of microcapsules. Furthermore, such products are suitable for use as detergents, detergent additives, emulsifiers, dispersing agents, additives for agents conferring hydrophobic properties or as such agents themselves, agents which confer a soft handle and hydrophobic properties, or carriers.

The examples which follow explain the invention without restricting it thereto. In the examples, percentages are percentages by weight throughout.

EXAMPLE 1

187 g (2 mols) of monomethylolurea containing about 7 g of water (manufactured according to Houben-Weyl, Methoden der organischem Chemie (Methods of Organic Chemistry), 4th edition, volume XIV, part 2, page 348) are mixed with 900 g of n-butanol and 4 g of glacial acetic acid and heated to 100°C until a sample, on cooling, remains clear, which is the case after some minutes. 334 g of dodecanol (= 90% of 2 mols) are now added and 880 to 890 g of n-butanol are distilled off in vacuo over the course of 2 hours at 55°–80°C. The dodecylether formed is neutralised with 10 g of triethanolamine and 200 g of ethanol and 200 g of 36.5% strength formaldehyde (2.4 mols) are added, the mixture is stirred for 2 hours at 85°C and the insoluble resin formed is filtered off whilst hot. The dimethylolurea-monododecyl-ether easily dissolves in hot dilute ethanol and on cooling a part thereof crystallises out whilst the remainder can be isolated by evaporation of the mother liquor. 28.8 g of dimethylolurea-monododecyl-ether are condensed with 30 g of polyethylene glycol of average molecular weight 300 in the presence of 1.0 g of glacial acetic acid in vacuo at 20 mm Hg and 90°–100°C. 2.5 g of water and acetic acid are evolved. After 1¼ hours 2.1 g of triethanolamine are added and the mixture is cooled. A liquid surface-active agent is obtained, which easily dissolves in water to give a foaming solution of pH = 7.9.

The infra-red spectrum of this product shows the following bands:

| | | |
|---|---|---|
| Broad | band at approx. | 3,650 cm$^{-1}$, weak |
| Broad shoulder | band at approx. | 3,560 cm$^{-1}$, weak |
| Broad shoulder | band at approx. | 3,420 cm$^{-1}$, weak-medium |
| Broad | band at approx. | 3,350 cm$^{-1}$, medium |
| Sharp shoulder | band at approx. | 2,970 cm$^{-1}$, weak |
| Sharp | band at approx. | 2,910 cm$^{-1}$, strong |
| Sharp | band at approx. | 2,850 cm$^{-1}$, strong |
| Broad shoulder | band at approx. | 2,750 cm$^{-1}$, weak |
| Broad | band at approx. | 2,450 cm$^{-1}$, weak |
| Broad | band at approx. | 1,670 cm$^{-1}$, medium |
| Sharp | band at approx. | 1,590 cm$^{-1}$, weak |
| Broad | band at approx. | 1,535 cm$^{-1}$, weak-medium |
| Broad | band at approx. | 1,450 cm$^{-1}$, weak-medium |
| Sharp shoulder | band at approx. | 1,360 cm$^{-1}$, weak |
| Sharp | band at approx. | 1,340 cm$^{-1}$, weak-medium |
| Broad shoulder | band at approx. | 1,280 cm$^{-1}$, weak-medium |
| Broad shoulder | band at approx. | 1,235 cm$^{-1}$, weak |
| Broad shoulder | band at approx. | 1,195 cm$^{-1}$, weak-medium |
| Broad shoulder | band at approx. | 1,130 cm$^{-1}$, strong |
| Broad shoulder | band at approx. | 1,085 cm$^{-1}$, weak-medium |
| Broad shoulder | band at approx. | 1,040 cm$^{-1}$, strong |
| Broad | band at approx. | 930 cm$^{-1}$, weak |
| Broad | band at approx. | 875 cm$^{-1}$, weak |

EXAMPLE 2 a. 28.8 g of dimethylolurea-monododecyl-ether which has been manufactured in the manner described in Example 1 are mixed with 154 g of polyethylene glycol of average molecular weight 600 and condensed, in the presence of 1 g of glacial acetic acid, at 90°–100°C and 15 mm Hg. Within 1 hour, about 2.5 g of distillate consisting of water and a little acetic acid are obtained. 2 g of triethanolamine are added to the residue. After cooling, a waxy substance is obtained, which gives strongly foaming solutions in water. If the aqueous solution of the surface-active agent is acidified with a little dilute phosphoric acid, the foam initially persists. However, on heating the foam "breaks", the solution turns cloudy, flocculated resin separates out and the solution no longer foams.

The infra-red spectrum of this product shows the following bands:

| | | |
|---|---|---|
| Broad | band at approx. | 3,640 cm$^{-1}$, weak |
| Broad shoulder | band at approx. | 3,550 cm$^{-1}$, weak |
| Broad shoulder | band at approx. | 3,420 cm$^{-1}$, weak-medium |
| Broad | band at approx. | 3,350 cm$^{-1}$, weak-medium |
| Sharp shoulder | band at approx. | 2,960 cm$^{-1}$, weak-medium |
| Sharp | band at approx. | 2,900 cm$^{-1}$, strong |
| Broad shoulder | band at approx. | 2,850 cm$^{-1}$, strong |
| Broad shoulder | band at approx. | 2,720 cm$^{-1}$, weak |
| Broad | band at approx. | 2,460 cm$^{-1}$, weak |
| Broad | band at approx. | 1,665 cm$^{-1}$, medium |
| Broad | band at approx. | 1,525 cm$^{-1}$, weak-medium |
| Broad | band at approx. | 1,450 cm$^{-1}$, weak-medium |
| Broad shoulder | band at approx. | 1,365 cm$^{-1}$, weak |
| Sharp | band at approx. | 1,340 cm$^{-1}$, weak-medium |
| Sharp | band at approx. | 1,315 cm$^{-1}$, weak |
| Broad | band at approx. | 1,280 cm$^{-1}$, weak-medium |
| Broad shoulder | band at approx. | 1,235 cm$^{-1}$, weak |
| Broad shoulder | band at approx. | 1,185 cm$^{-1}$, weak-medium |
| Broad shoulder | band at approx. | 1,125 cm$^{-1}$, strong |
| Broad | band at approx. | 1,085 cm$^{-1}$, weak-medium |
| Broad shoulder | band at approx. | 1,030 cm$^{-1}$, strong |
| Broad shoulder | band at approx. | 935 cm$^{-1}$, weak-medium |
| Broad shoulder | band at approx. | 920 cm$^{-1}$, weak-medium |
| Broad | band at approx. | 870 cm$^{-1}$, weak |
| Broad | band at approx. | 835 cm$^{-1}$, weak | b. A similar product is obtained if instead of the polyethylene glycol of average molecular weight 600, 154 g of a polyethylene glycol of average molecular weight 1,540 is used.

EXAMPLE 3 a. Monomethylolurea (compare Example 1) is etherified with a mixture of higher alkanols with 12–15 carbon atoms, of average molecular weight 207. The etherification product is reacted with formaldehyde to give a derivative of dimethylolurea. 31 g (approx. 1/10 mol) of this dimethylolureamonoalkanol-ether are condensed with 60 g of polyethylene glycol of average molecular weight 600, in the presence of 1 g of glacial acetic acid, in vacuo at 90°–130°C and 20 mm Hg. A total of 1.6 g of distillate (water and a little acetic acid) is collected. The residue is neutralised by adding 2.6 g of triethanolamine and after cooling a viscous liquid product is obtained, which dissolves in water to give a slightly cloudy, strongly foaming solution.

The infra-red spectrum of this product shows the following bands:

| | | | |
|---|---|---|---|
| Broad | band at approx. | 3,650 cm⁻¹, | weak |
| Broad shoulder | band at approx. | 3,570 cm⁻¹, | weak-medium |
| Broad shoulder | band at approx. | 3,430 cm⁻¹, | medium |
| Broad | band at approx. | 3,370 cm⁻¹, | medium |
| Sharp shoulder | band at approx. | 2,970 cm⁻¹, | medium |
| Sharp shoulder | band at approx. | 2,920 cm⁻¹, | strong |
| Sharp shoulder | band at approx. | 2,870 cm⁻¹, | strong |
| Sharp shoulder | band at approx. | 2,740 cm⁻¹, | weak |
| Broad | band at approx. | 2,460 cm⁻¹, | weak |
| Broad | band at approx. | 1,670 cm⁻¹, | medium |
| Sharp | band at approx. | 1,595 cm⁻¹, | weak |
| Broad | band at approx. | 1,540 cm⁻¹, | weak-medium |
| Broad | band at approx. | 1,455 cm⁻¹, | medium |
| Sharp shoulder | band at approx. | 1,385 cm⁻¹, | weak |
| Sharp | band at approx. | 1,345 cm⁻¹, | medium |
| Sharp | band at approx. | 1,320 cm⁻¹, | weak |
| Broad | band at approx. | 1,290 cm⁻¹, | weak-medium |
| Broad shoulder | band at approx. | 1,230 cm⁻¹, | weak |
| Broad shoulder | band at approx. | 1,195 cm⁻¹, | weak-medium |
| Broad shoulder | band at approx. | 1,130 cm⁻¹, | medium-strong |
| Broad shoulder | band at approx. | 1,090 cm⁻¹, | weak |
| Broad shoulder | band at approx. | 1,040 cm⁻¹, | medium-strong |
| Sharp | band at approx. | 945 cm⁻¹, | weak-medium |
| Broad shoulder | band at approx. | 925 cm⁻¹, | weak-medium |
| Sharp | band at approx. | 880 cm⁻¹, | weak |
| Broad | band at approx. | 835 cm⁻¹, | weak | b. A similar product is obtained if the dimethylureamonoalkanol-ether is condensed with 30 g of polyethylene glycol of average molecular weight 300.

EXAMPLE 4

90 g (1/4 mol) of monomethylolurea-hydroabietyl-ether, manufactured from monomethylolurea-butyl-ether by trans-etherification with hydroabietyl alcohol are dissolved in 500 g of ethanol, and 30 g of 36.5% strength aqueous formaldehyde and sufficient triethanolamine for the solution to react distinctly alkaline are added. After the mixture has been stirred for 2 hours at 70°C, it is evaporated to dryness in vacuo and 98 g (1/4 mol) of dimethylolurea-monohydroabietyl-ether are obtained. This is treated with 150 g of polyethylene glycol of average molecular weight 600 and 4 g of glacial acetic acid and condensed for 1½ hours at 90–95°C in vacuo. 6 g of water and acetic acid collect in the receiver. The liquid-viscous reaction product is now again rendered slightly alkaline by adding triethanolamine. It easily dissolves in water to give an opalescent foaming solution. If this solution is treated with acid until it reacts slightly acid to Congo Red, a white insoluble resin separates out slowly at ordinary temperature or rapidly on heating, and at the same time the aqueous liquid completely loses its foaming power.

The infra-red spectrum of this product shows the following bands:

| | | | |
|---|---|---|---|
| Broad | band at approx. | 3,640 cm⁻¹, | weak |
| Broad shoulder | band at approx. | 3,550 cm⁻¹, | weak |
| Broad shoulder | band at approx. | 3,430 cm⁻¹, | weak-medium |
| Broad | band at approx. | 3,360 cm⁻¹, | medium |
| Sharp shoulder | band at approx. | 2,970 cm⁻¹, | medium |
| Broad shoulder | band at approx. | 2,910 cm⁻¹, | strong |
| Sharp shoulder | band at approx. | 2,860 cm⁻¹, | strong |
| Broad shoulder | band at approx. | 2,730 cm⁻¹, | weak |
| Broad | band at approx. | 2,450 cm⁻¹, | weak |
| Broad shoulder | band at approx. | 1,740 cm⁻¹, | weak |
| Broad | band at approx. | 1,670 cm⁻¹, | medium |
| Broad | band at approx. | 1,530 cm⁻¹, | medium |
| Broad | band at approx. | 1,450 cm⁻¹, | medium |
| Broad shoulder | band at approx. | 1,370 cm⁻¹, | weak |
| Sharp | band at approx. | 1,340 cm⁻¹, | weak-medium |
| Sharp | band at approx. | 1,315 cm⁻¹, | weak |
| Broad | band at approx. | 1,280 cm⁻¹, | weak-medium |
| Broad shoulder | band at approx. | 1,240 cm⁻¹, | weak |
| Broad shoulder | band at approx. | 1,190 cm⁻¹, | weak-medium |
| Broad shoulder | band at approx. | 1,125 cm⁻¹, | strong |
| Broad | band at approx. | 1,085 cm⁻¹, | weak-medium |
| Broad shoulder | band at approx. | 1,035 cm⁻¹, | strong |
| Broad | band at approx. | 940 cm⁻¹, | weak-medium |
| Broad shoulder | band at approx. | 920 cm⁻¹, | weak-medium |
| Broad | band at approx. | 875 cm⁻¹, | weak |
| Broad | band at approx. | 840 cm⁻¹, | weak |

EXAMPLE 5

1 mol of formaldehyde is added onto 342 g (1 mol) of monomethylolurea-stearyl-ether, manufactured from the n-butyl ether by trans-etherification with stearyl alcohol, in an alcoholic, slightly alkaline solution and after the resin formed has been filtered off 340 g of dimethylolureamonostearyl-ether (M = 372) are obtained. 37.2 g (1/10 mol) of this product are condensed with 154 g of polyethylene glycol of average molecular weight 1,540 in the presence of 1 g of glacial acetic acid in vacuo at 90°–100°C for 1½ hours. 2 g of triethanolamine are then added and the mixture is stirred and cooled. A waxy substance which is easily soluble in water to give a slightly cloudy solution is obtained. The solution of the substance, which foams markedly, shows a noteworthy washing and wetting action. It proves to be a typical reactive surface-active agent in that the surfaceactive properties can be totally destroyed by acidification, rapidly on heating or slowly at ordinary temperature. The solution deposits solid resin and no longer foams.

The infra-red spectrum of this product shows the following bands:

| | | | |
|---|---|---|---|
| Broad | band at approx. | 3,640 cm⁻¹, | weak |
| Broad shoulder | band at approx. | 3,560 cm⁻¹, | weak |
| Broad shoulder | band at approx. | 3,460 cm⁻¹, | weak-medium |
| Broad | band at approx. | 3,440 cm⁻¹, | weak |
| Broad shoulder | band at approx. | 3,360 cm⁻¹, | weak-medium |
| Sharp shoulder | band at approx. | 2,970 cm⁻¹, | weak-medium |
| Broad shoulder | band at approx. | 2,910 cm⁻¹, | strong |
| Broad shoulder | band at approx. | 2,860 cm⁻¹, | strong |
| Broad shoulder | band at approx. | 2,730 cm⁻¹, | weak |
| Broad | band at approx. | 2,460 cm⁻¹, | weak |
| Broad | band at approx. | 1,680 cm⁻¹, | weak-medium |
| Broad | band at approx. | 1,630 cm⁻¹, | weak |
| Broad | band at approx. | 1,535 cm⁻¹, | weak-medium |
| Broad | band at approx. | 1,450 cm⁻¹, | medium |
| Sharp | band at approx. | 1,345 cm⁻¹, | medium |
| Sharp | band at approx. | 1,320 cm⁻¹, | weak |
| Broad | band at approx. | 1,290 cm⁻¹, | weak-medium |
| Broad shoulder | band at approx. | 1,240 cm⁻¹, | weak |
| Broad shoulder | band at approx. | 1,190 cm⁻¹, | weak-medium |
| Broad shoulder | band at approx. | 1,130 cm⁻¹, | strong |
| Broad | band at approx. | 1,090 cm⁻¹, | medium |
| Broad shoulder | band at approx. | 1,040 cm⁻¹, | medium |
| Broad shoulder | band at approx. | 995 cm⁻¹, | weak |
| Broad | band at approx. | 945 cm⁻¹, | weak-medium |
| Broad | band at approx. | 920 cm⁻¹, | weak-medium |
| Broad shoulder | band at approx. | 880 cm⁻¹, | weak |
| Broad | band at approx. | 850 cm⁻¹, | weak |

EXAMPLE 6

Instead of the stearyl-ether mentioned in Example 5, the corresponding monomethylolurea-oleyl-ether is chosen as the starting product and converted into the dimethylolurea derivative by addition of 1 mol of formaldehyde, and 1 mol of this derivative is condensed with 1 mol of polyethylene glycol of average molecular weight 1,000 in the presence of acetic acid or formic acid. After neutralisation with morpholine or triethanolamine a soft waxy, easily water-soluble product is obtained. This proves, like the product of Example 5, to be a typical surface-active agent which at the same time possesses the properties of a curable primary condensate. The infra-red spectrum of this product shows the following bands:

| | | | |
|---|---|---|---|
| Broad | band at approx. | 3,640 cm⁻¹. | weak |
| Broad shoulder | band at approx. | 3,550 cm⁻¹. | weak |
| Broad shoulder | band at approx. | 3,420 cm⁻¹. | weak-medium |
| Broad shoulder | band at approx. | 3,350 cm⁻¹. | weak-medium |
| Sharp shoulder | band at approx. | 2,970 cm⁻¹. | weak-medium |
| Sharp shoulder | band at approx. | 2,910 cm⁻¹. | strong |
| Broad shoulder | band at approx. | 2,860 cm⁻¹. | strong |
| Broad shoulder | band at approx. | 2,740 cm⁻¹. | weak |
| Broad | band at approx. | 2,450 cm⁻¹. | weak |
| Sharp shoulder | band at approx. | 1,710 cm⁻¹. | weak-medium |
| Broad | band at approx. | 1,670 cm⁻¹. | weak-medium |
| Broad | band at approx. | 1,535 cm⁻¹. | weak-medium |
| Broad | band at approx. | 1,450 cm⁻¹. | weak-medium |
| Sharp | band at approx. | 1,345 cm⁻¹. | weak-medium |
| Sharp | band at approx. | 1,320 cm⁻¹. | weak |
| Broad | band at approx. | 1,285 cm⁻¹. | weak-medium |
| Broad shoulder | band at approx. | 1,240 cm⁻¹. | weak |
| Broad shoulder | band at approx. | 1,200 cm⁻¹. | weak-medium |
| Broad shoulder | band at approx. | 1,130 cm⁻¹. | strong |
| Broad | band at approx. | 1,090 cm⁻¹. | medium |
| Broad shoulder | band at approx. | 1,040 cm⁻¹. | strong |
| Broad | band at approx. | 940 cm⁻¹. | weak-medium |
| Broad shoulder | band at approx. | 920 cm⁻¹. | weak-medium |
| Broad | band at approx. | 875 cm⁻¹. | weak |
| Broad | band at approx. | 840 cm⁻¹. | weak |

EXAMPLE 7

28.8 g of dimethylolurea-monododecyl-ether (manufactured according to Example 1) and 14.9 g of triethanolamine are heated in vacuo to 120°– 130°C until a sample dissolves in 10 % strength acetic acid. A typical, foaming surfaceactive agent solution is obtained, which on heating, especially after addition of mineral acid, deposits an insoluble hydrophobic resin.

The infra-red spectrum of this product shows the following bands:

| | | | |
|---|---|---|---|
| Broad | band at approx. | 3,640 cm⁻¹. | weak |
| Broad | band at approx. | 3,330 cm⁻¹. | strong |
| Sharp shoulder | band at approx. | 2,970 cm⁻¹. | weak-medium |
| Broad | band at approx. | 2,910 cm⁻¹. | medium |
| Sharp | band at approx. | 2,840 cm⁻¹. | weak-medium |
| Broad shoulder | band at approx. | 2,810 cm⁻¹. | medium |
| Broad shoulder | band at approx. | 2,740 cm⁻¹. | weak-medium |
| Broad | band at approx. | 2,460 cm⁻¹. | weak |
| Broad | band at approx. | 1,665 cm⁻¹. | strong |
| Broad | band at approx. | 1,545 cm⁻¹. | medium |
| Broad | band at approx. | 1,450 cm⁻¹. | weak-medium |
| Broad shoulder | band at approx. | 1,390 cm⁻¹. | weak |
| Broad shoulder | band at approx. | 1,370 cm⁻¹. | weak |
| Broad shoulder | band at approx. | 1,355 cm⁻¹. | weak |
| Broad shoulder | band at approx. | 1,305 cm⁻¹. | weak |
| Broad shoulder | band at approx. | 1,275 cm⁻¹. | weak |
| Broad shoulder | band at approx. | 1,240 cm⁻¹. | weak |
| Broad shoulder | band at approx. | 1,200 cm⁻¹. | weak-medium |
| Broad shoulder | band at approx. | 1,140 cm⁻¹. | weak |
| Broad shoulder | band at approx. | 1,060 cm⁻¹. | medium |
| Broad shoulder | band at approx. | 1,030 cm⁻¹. | strong |
| Sharp | band at approx. | 900 cm⁻¹. | weak-medium |
| Sharp | band at approx. | 875 cm⁻¹. | medium |

EXAMPLE 8

90 g (=1 mol) of monomethylolurea are etherified with 300 g of polyethylene glycol of average molecular weight 300, and here again it is expedient first to manufacture the n-butyl-ether and to trans-etherify the latter with the poly-ethylene glycol. 1 mol of formaldehyde is added onto the monomethylolurea-polyglycol-ether in weakly alkaline aqueous solution, the resin formed is filtered off hot, and dimethylolurea etherified on one side with polyethylene glycol is thus obtained. Its aqueous solution is treated with 400 g of n-butanol and the water is distilled off in vacuo at 80°–85°C, whilst the n-butanol runs back again (water separator). The anhydrous solution is treated with 100 g of n-dodecanol and 5 g of glacial acetic acid and the n-butanol is removed in vacuo at 75°–105°C. As a result of this second trans-etherification, 492 g of a viscous liquid product which easily dissolves in water to give a slightly cloudy, foaming solution of high washing power are obtained. It has a pH value of 7.6. If the pH value is lowered to 2.5–3.0, the product proves to be a typical reactive surface-active agent: it flocculates irreversibly.

EXAMPLE 9

28.8 g of dimethylolurea-monododecyl-ether which has been manufactured in the manner described in Example 1 are heated with 30 g (0.1 mol) of a polyglycol-ether consisting of approx. 86% of ethylene oxide and approx. 14% of propylene oxide, in the presence of 1 g of glacial acetic acid, to 95°–100°C in vacuo for 1 hour, in the course of which water and formaldehyde escape. The residue is adjusted to a pH value of 8 with triethanolamine. A product of the formula

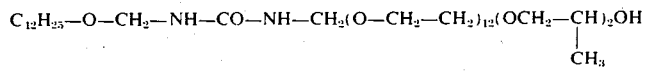

is obtained, which gives a cloudy solution in water and proves to be an acid-curable surface-active agent.

EXAMPLE 10

An 0.2% strength aqueous solution of the product according to Example 1 shows a noteworthy wetting action, which is determined by placing a 4 × 4 cm piece of grey calico fabric on the surface of the liquid and determining the time until the fabric has been completely wetted and sinks.

For comparison, the wetting times are also determined for other wetting agents. The following wetting times are found as the average value of 5 determinations:

| Fabric placed on | Wetting time seconds |
|---|---|
| Distilled water | ∞ fabric does not sink |
| 0.2% strength aqueous solution of sodium diisobutylnaphthalene-sulphonate (not crosslinkable) | 4.8 |
| High molecular reactive surface-active agent according to Example 5 of DOS 1,719,404 | 72.0 |
| 0.2% strength solution of surface-active agent according to Example 1 of the present invention | 5.4 |

EXAMPLE 11

The difference between the reactive surface-active agent according to the present invention and one of the customary wetting agents, for example Na lauryl-sulphate is that the reactive surface-active agent cross-links and flocculates on acidifying the solution whilst the customary surface-active agent remains unchanged. Whilst the surface tension of the water is reduced by approximately the same amount by both types of surface-active agent (increase in the number of drops), this "tension reduction" can again be annulled in the case of the reactive surface-active agent. This can be seen from the following figures:

| | |
|---|---|
| Distilled water, in a stalagometer at 20°C, gives a drop number of: | 53 |
| An 0.2% strength solution of Na lauryl-sulphate correspondingly gives a number of: | 100 |
| The same solution adjusted to pH = 2.0 after 24 hours gives a drop number of: | 106 |
| An 0.2% strength solution of the reactive surface-active agent according to Example 1 gives a drop number of: | 97 |
| The same solution adjusted to pH = 2.0 after 24 hours gives a drop number of: | 59 |

EXAMPLE 12

Both products are used in 0.2% strength solution, together with 0.1% of sodium carbonate, for washing grey wool. The washing effect (degree of whiteness) is distinctly superior to that obtained with macromolecular surface-active agents. The wool grease can easily be removed from the wool washing liquors by adjusting the pH to 3.5 with mineral acid and letting the mixture stand for some hours at room temperature. The surface-active agent flocculates and can be removed quantitatively together with the wool grease. The water of the washing liquor is completely clarified.

We claim:

1. A process for the manufacture of reactive surface-active compounds of the formula
   R-O-CH$_2$-NH-CO-NH-CH$_2$-O-X
   wherein R represents alkyl or alkenyl each with 6 to 22 carbon atoms, cycloalkyl with 8 to 14 carbon atoms, alkylcyclohexyl or alkylphenyl each with 2 to 12 carbon atoms in the alkyl part, and X represents the residue of a polyalkylene glycol of average molecular weight at most 2000, which comprises the steps of,
   a. etherifying or transetherifying a compound of the formula
      H$_2$N—CO—NH—CH$_2$—O—Z
      wherein X represents hydrogen or alkyl having 4 to 7 carbon atoms, with a hydrophobic hydroxy compound of the formula R—OH or a hydrophilic hydroxy compound of the formula X—OH, thereafter
   b. introducing a second methylol group into the resulting monomethylolether compound by reaction with formaldehyde, trioxane, paraformaldehyde or hexamethylenetetramine in dilute alcoholic alkaline solution at temperatures of 40° to 100°C, and
   c. etherifying this product with a compound X—OH or R—OH to obtain an end product of the above formula, wherein X and R have the same meaning given above and wherein steps (a) and (c) are carried out in the presence of an alkane carboxylic acid with 1 to 3 carbon atoms at a temperature of 80° to 120°C and a pressure of 1 to 30 mm Hg.

2. A process according to claim 1 wherein R represents alkyl with 10 to 18 carbon atoms.

3. A process according to claim 1, wherein a polyethylene glycol of average molecular weight of 106 to 1500 is used.

4. A process according to claim 1, wherein steps (a) and (c) are carried out at a pressure of 10 to 25 mm Hg.

5. A process for the manufacture of reactive surface-active compounds of the formula
   R—O—CH$_2$—NH—CO—NH—CH$_2$—O—X
   wherein R represents alkyl or alkenyl each with 6 to 22 carbon atoms, cycloalkyl with 8 to 14 carbon atoms, alkylcyclohexyl or alkylphenyl each with 2 to 12 carbon atoms in the alkyl part, and X represents the residue of a polyalkylene glycol of average molecular weight of at most 2000, which comprises the steps of,
   a'. reacting a compound of the formula
      H$_2$N—CO—CH$_2$—O—R
      with formaldehyde, trioxane, paraformaldehyde or hexamethylene-tetramine in dilute alcoholic alkaline solution at temperatures of 40° to 100°C, and wherein R has the same meaning given above and
   b'. etherifying this product with a polyalkylene glycol of average molecular weight at most 2000 in the presence of an alkane carboxylic acid with 1 to 3 carbon atoms at a temperature of 80° to 120°C and a pressure of 1 to 30 mm Hg.

6. A process according to claim 5, wherein R represents alkyl with 10 to 18 carbon atoms.

7. A process according to claim 5, wherein a polyethylene glycol of average molecular weight of 106 to 1500 is used.

8. A process according to claim 5, wherein the step (b') is carried out at a pressure of 10 to 25 mm Hg.

* * * * *

UNITED STATES PATENT AND TRADEMARK OFFICE
CERTIFICATE OF CORRECTION

PATENT NO. : 3,927,089
DATED : December 16, 1975
INVENTOR(S) : LUZIUS SCHIBLER ET AL It is certified that error appears in the above–identified patent and that said Letters Patent are hereby corrected as shown below:

Column 11, claim 1, line 39, delete "X" and insert
--- Z ---.

Signed and Sealed this first Day of June 1976

[SEAL]

Attest:

RUTH C. MASON
Attesting Officer

C. MARSHALL DANN
Commissioner of Patents and Trademarks